Aug. 10, 1965   G. M. DE LALIO   3,199,376
STEERING TRANSMISSION FOR TRACK LAYING VEHICLES
Filed May 31, 1962   4 Sheets-Sheet 1

INVENTOR
GEORGE M. DELALIO

BY
ATTORNEYS

Aug. 10, 1965  G. M. DE LALIO  3,199,376
STEERING TRANSMISSION FOR TRACK LAYING VEHICLES
Filed May 31, 1962  4 Sheets-Sheet 3

INVENTOR
GEORGE M. DeLALIO
BY Shoemaker and Mattare
ATTORNEYS

INVENTOR
GEORGE M. DeLALIO

BY Shoemaker and Mattare
ATTORNEYS

United States Patent Office 3,199,376
Patented Aug. 10, 1965

3,199,376
STEERING TRANSMISSION FOR TRACK
LAYING VEHICLES
George M. De Lalio, Smithtown, N.Y.
(Capel Drive, R.D. 6, Huntington, N.Y.)
Filed May 31, 1962, Ser. No. 198,873
4 Claims. (Cl. 74—720.5)

The present invention relates to a new and novel steering transmission for track laying vehicles and the like, and is particularly directed to an integral unit which provides both continuously variable steering control and infinitely variable speed ratio control. This type of transmission is especially suitable for use with track laying and wheeled tractor type vehicles where the track or wheel speeds are adjusted to control the vehicle speed and direction.

Continuously variable steering permits the drive output means at each side of the vehicle to be varied through a wide range of speeds ranging from zero to maximum output, thereby providing the maximum degree of versatility and ease of control since it allows the vehicle to operate at any turn radius so that the vehicle may be operated through a range from straight line movement to pivoting about the center of the vehicle. Structures for obtaining this type of steering as employed in the prior art have generally incorporated mechanical clutch and brake devices, but it is preferable to eliminate this type of mechanism in the steering system since such clutches and brakes are subjected to excessive wear and consume power when the turning radius of the vehicle does not remain constant.

In high speed vehicles such as military tanks and the like where the power per ton of weight is limited, it is particularly advantageous to provide a steering system which is regenerative. A regenerative steering system is one wherein any braking power that is imposed on the drive means at one side of the vehicle, such as the inside track of a track laying vehicle to effect steering, is regenerated to the outside drive means or track to increase the tractive power at such outside drive means.

The present invention is designed to provide this highly desirable type of regenerative steering system.

In addition, in high speed vehicles as discussed above, it is preferred that the steering system be modulated, or in other words, as the speed of the vehicle increases, it is desirable that the minimum turning radius increases and the sensitivity of the steering system decreases to provide greater stability and safety in operation.

The present invention is also designed to provide such modulated steering as discussed above.

A transmission incorporating infinitely variable speed ratio control provides variation or changing of the drive ratio in infinitely small steps. This allows ideal matching of the engine to the vehicle operation for increasing fuel economy and also provides smooth positive drive during all operations which increases the vehicle mobility.

For most track laying and steering tractor type vehicles, it is required that the full power ratio spread of the transmission be between 10:1 and 15:1. It is also important that the efficiency be high and that this high efficiency be maintained over the entire range of operation.

The present invention incorporates in a single integral unit the desired functions of the steering and ratio control systems by providing a novel combination of planetary gearings which are connected with variable hydraulic transmission in order to obtain the desired results. The hydraulic transmissions according to the present invention are of the hydrostatic type which include reciprocating pistons and variable angle swash plates which is wellknown in the art.

In prior art constructions employing hydrostatic units for obtaining ratio control, it has been necessary either to provide very large hydrostatic units or a plurality of hydrostatic units to achieve the desired ratio spread. In the present invention, the desired ratio spread is achieved by providing different stages of operation. With this construction, the amount of power which is transferred through the hydrostatic circuit within each stage or ratio range is substantially reduced. This decreases the size of the hydrostatic pump-motor circuit proportionately, and since it is well known that such circuits are less efficient than mechanical gear trains, the smaller the percentage of power which is hydraulically transferred the greater is the over-all efficiency.

Furthermore, with the arrangement of the present invention, the hydrostatic pump and motor elements operate over their full speed capabilities in each stage or ratio range of operation. This allows use of smaller displacement pump and motor components which further reduces the size of the pump-motor circuit.

In most track type vehicles, it is preferred that the tracks extend beyond the hull so that the vehicle does not "hang up" when negotiating ditches or steep grades. This requires that the hull diameter at the sprockets be less than the track sprocket diameter. It is therefore preferred that the transmission radius at the sprocket connections be kept to a minimum.

It is also preferred that the engine and transmission be grouped within a minimum length in order to provide a more useful vehicle configuration. It is therefore advantageous that the length of the transmission be kept to a minimum. Accordingly, the over-all transmission of the present invention has been particularly designed with the intent of providing a minimum radius and also a minimum over-all length.

In the present invention, the ratio control system provides different stages of operation by changing drive ratio connections within the mechanical gear train. This changing of drive connections may be made by any suitable selective coupling means, and may take the form of friction clutches and brakes which function in an interrelated manner with the mechanical planetary gearing. An important feature of the invention is the fact that change of drive connections is made only when the elements being connected and disconnected are transmitting no power. This minimizes the wear on the elements to provide maximum useful life thereof, and further ensures that there is no interruption of the driving power during transition between stages. Within each of the stages of operation, the speed ratio is controlled by the hydrostatic pump-motor circuit.

The present invention also provides a means for reversing direction of the vehicle. In prior art mechanical-hydrostatic power systems which utilize planetary gear sets controlled by hydrostatic pumps and motors, since the input turns in one direction the output torque of the planetary gear sets is also always in one direction. In these types of systems, for reverse operation it is necessary that the hydrostatic system supply reverse torque to drive the vehicle plus additional reverse torque to overcome the normal forward driving torque of the planetary gear set. Therefore, the total hydraulic driving power in reverse must be in excess of that required to drive the vehicle and must be more than 100 percent of the input power. It is apparent that this condition of operation greatly increases the size and operating pressure of the hydrostatic units. On the other hand, in the present invention, a mechanical reverse is provided which is operative with the planetary gear set that provides the lowest stage or range of operation. Therefore, in reverse operation, the hydrostatic system operates at the same power, speed and pressure as it does in the low speed stage in a forward direction.

A further feature of the invention is the provision of a modified form wherein the clutches and brakes employed in the speed ratio control portion of the transmission are synchronized in such a manner that not only are the clutches and brakes unloaded during transition from stage to stage, but the friction elements of such clutches and brakes have substantially no relative movement with respect to one another when engaging and disengaging.

An object of the invention is to provide a steering transmission for track laying vehicles which incorporates in an integral unit means for providing both continuously variable steering control and infinitely variable speed ratio control.

Another object of the invention is to provide a steering transmission for track laying vehicles which eliminates clutch and brake mechanisms in the steering control system.

A further object of the invention is the provision of a steering transmission for track laying vehicles incorporating a regenerative steering system wherein any braking power imposed on an inside track of a vehicle for example while turning increases the tractive power on the outside track of the vehicle.

A still further object of the invention is to provide a steering transmission for track laying vehicles incorporating a modulated steering system such that as the speed of the vehicle increases the sensitivity of the steering system decreases resulting in a larger turning radius to provide greater stability and safety.

Yet another object of the invention is the provision of a steering transmission for track laying vehicles incorporating an arrangement whereby the hydraulic means employed in the system can be smaller and more compact than corresponding hydraulic means of prior art arrangements.

Still another object of the invention is to provide a steering transmission for track laying vehicles wherein the shifting of the clutches and brakes of the ratio control system for achieving the desired stages of operation occurs only when the clutch and brake elements are not transmitting power to thereby reduce wear on the clutch and brake elements.

Yet a further object of the invention is to provide a steering transmission for track laying vehicles including means for providing a reverse drive through the transmission wherein the hydrostatic system operates at low power, speed and pressure.

A further object of the invention is to provide a steering transmission for track laying vehicles incorporating clutch and brake mechanisms in the ratio control system wherein the friction elements of the clutch and brake mechanisms have substantially no relative movement with respect to one another when engaging and disengaging.

Other objects and many attendant advantages of the invention will become more apparent when considered in connection with the specification and accompanying drawings, wherein:

FIG. 9 is a somewhat schematic sectional view through a second form of the transmission according to the present invention;

FIG. 10 is a sectional view taken substantially along line 10—10 of FIG. 9 looking in the direction of the arrows.

Figure 1:
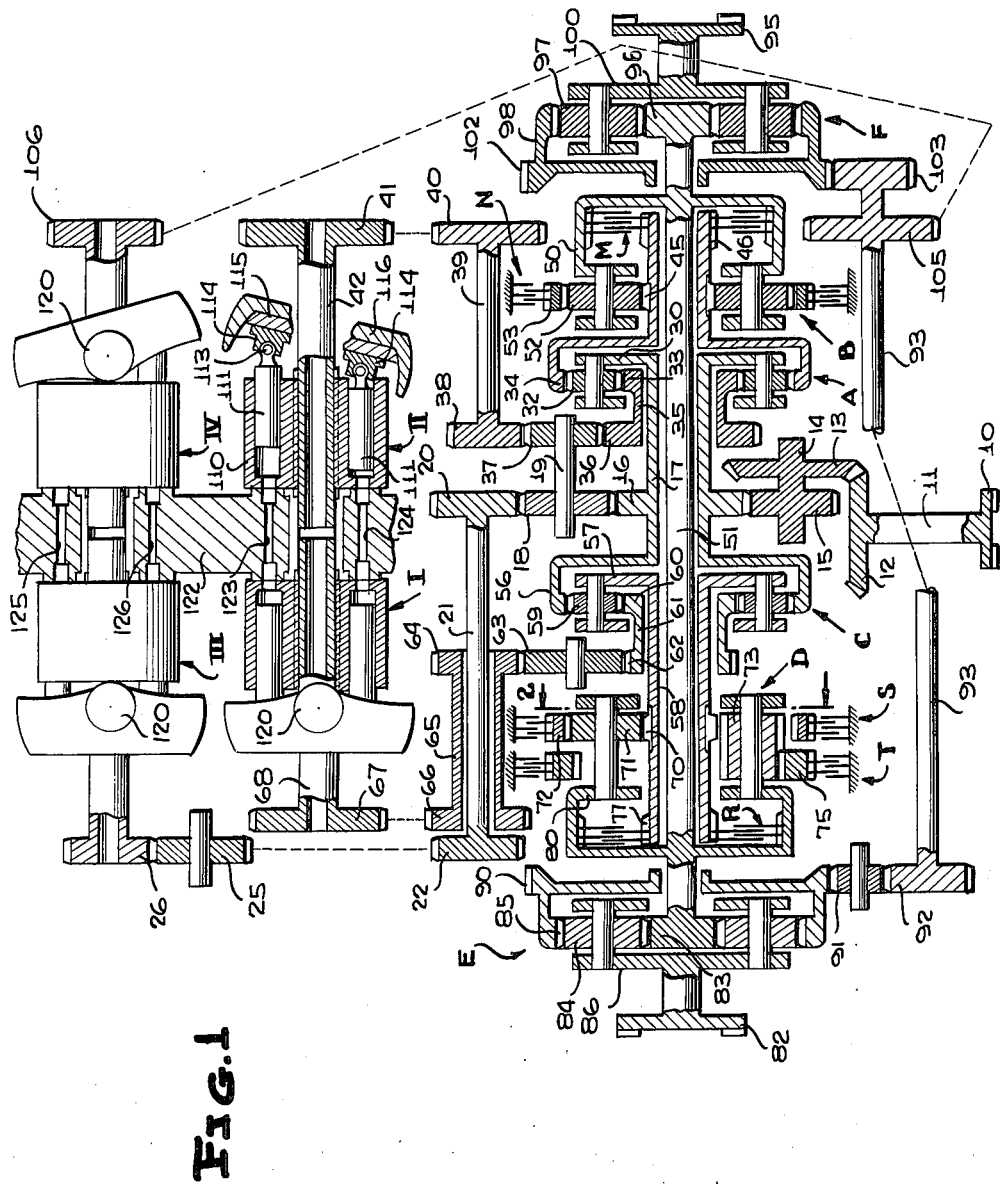
FIG. 1 is a somewhat schematic sectional illustration illustrating a first form of the present invention.

Referring now to the drawings wherein like reference characters designate corresponding parts throughout the several views, there is shown in FIG. 1 a first modification of the invention, and it should be noted at the outset that the illustrations of the structure in the present invention are somewhat diagrammatic in nature in that the bearings and housing portions which support the various shafts and other structural components have been omitted for the sake of clarity, it being understood that these various components will be supported in a conventional manner.

An input drive flange 10 is connected to suitable driving means such as an engine or the like, this driving flange being connected through shaft 11 with a bevel gear 12 which in turn meshes with a bevel gear 13 on a shaft 14 having formed integrally therewith a gear 15. It is further noted at this point that various members such as gears 13 and 15 are illustrated as formed integral with an associated shaft member. Obviously, these gears need not be integral with an associated shaft as shown, and any conventional construction of this arrangement will suffice for the purposes of the present invention wherein for example the gears may be formed as separate members and suitably keyed or pinned to the associated shaft.

Gear 15 meshes with gear 16 formed on a central hollow shaft 17. Gear 16 also meshes with an idler gear 18 mounted on a shaft 19, gear 18 meshing with a gear 20 fixed to a counter shaft 21 having a gear 22 fixed at the outer end thereof. Gear 22 meshes with an idler gear 25 as indicated schematically by the dotted line which in turn meshes with a gear 26 which is connected with the input of a hydrostatic pump unit indicated by III.

The righthand portion 30 of central hollow shaft 17 forms a planet carrier of the planetary gear set indicated generally by A. Planet gears 32 are carried by the planet carrier 30, these planet gears meshing with a sun gear 33 and a ring gear 34. Sun gear 33 is formed on a hollow shaft 35 having a gear 36 formed at the lefthand portion thereof which meshes with an idler gear 37 which in turn meshes with a gear 38 formed at one end of a countershaft 39.

Countershaft 39 is provided with a gear 40 at the righthand end thereof which meshes with a gear 41 as indicated schematically by the dotted line, gear 41 in turn being connected with the shaft 42 which provides a driving connection with the hydrostatic unit indicated generally by II.

Ring gear 34 of planetary gear set A extends to the right to form the sun gear 45 of a planetary gear set indicated generally by B. This extension of ring gear 12 also forms the inner member 46 of a clutch indicated generally by M. The clutch is indicated somewhat schematically and may be for example a friction disc type clutch of a well-known construction.

The outer member 50 of clutch M actually comprises an integral flange formed on the central driven shaft 51, member 50 also serving as a planet carrier for the planet gears 52 of planetary gear set B, the planetary gears 52 meshing with a ring gear 53. A brake means indicated generally by N is provided which may be of the friction disc type, this brake means being connected with the ring gear 53 whereby actuation of the brake locks the ring gear 53 against rotation.

Central hollow shaft 17 extends to the left to form a ring gear 56 of a planet gear set indicated generally by C. A planet carrier 57 includes a hollow shaft 58 which extends to the left, the planet carrier supporting the planet gears 59 which mesh with a sun gear 60. Sun gear 60 is formed integral with a hollow shaft 61 which has a gear 62 formed at the opposite end thereof. Gear 62 meshes with an idler gear 63 which in turn meshes with a gear 64 formed at one end of a hollow counter shaft 65. Shaft 65 has a gear 66 formed at the opposite end thereof which meshes with a gear 67 as indicated schematically by the dotted line. Gear 67 is in turn connected with shaft 68 of the hydrostatic unit indicated generally by I to provide a driving connection with this unit.

Figure 2:
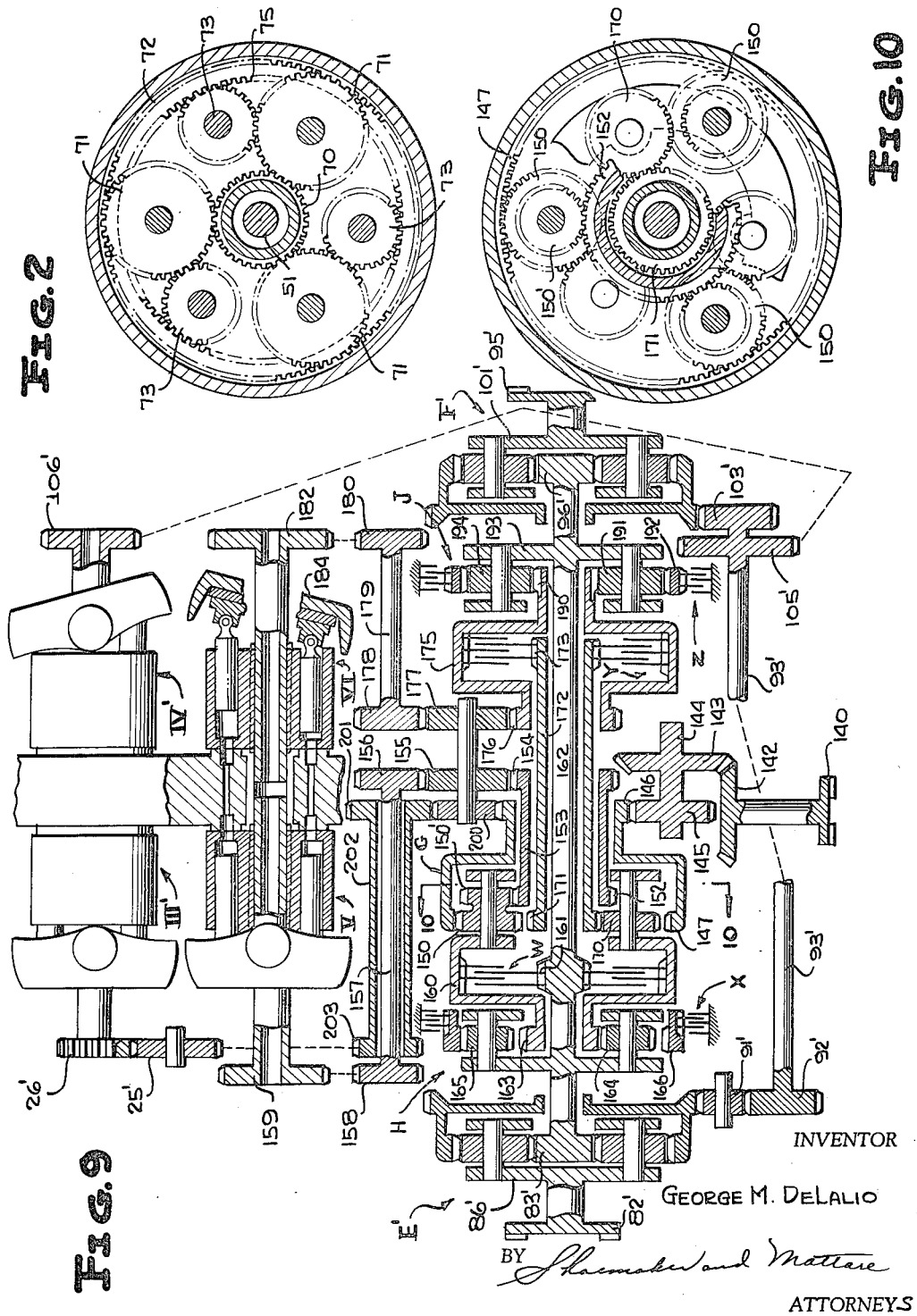
FIG. 2 is a sectional view taken substantially along line 2—2 of FIG. 1 looking in the direction of the arrows.

Hollow shaft 58 has a gear 70 formed thereon which serves as the sun gear of a planetary gear set D. Planetary gear set D is a compound gear arrangement and may be more clearly understood by reference to FIG. 2. Planet gears 71 of this gear set mesh with the sun gear 70 and the ring gear 72. Idler planet gears 73 mesh with planet gears 71 and also mesh with ring gear 75. A first brake means S which may be of the friction disc-type is operatively associated with ring gear 72, and a second similar brake T is operatively associated with ring gear 75. Actuation of the brake means S and T will serve to lock the respective ring gears against rotation.

It will be noted that hollow shaft 58 extends to the left to form the inner member 77 of a friction clutch indicated by R which may also be of the friction disc type. Planet carrier 80 which supports planet gears 71 forms the outer member of clutch R and extends inwardly and is connected with the central driven shaft 51.

A first output means in the form of an output drive flange 82 is adapted to be drivingly connected with a track or wheel at one side of a vehicle and is operatively connected with the lefthand end of the driven shaft 51 by means of the planetary gear set E. Planetary gear set E includes a sun gear 83 formed at the outer end of driven shaft 51 which meshes with planet gears 84 which in turn mesh with ring gear 85. Planet gears 84 are carried by a planet carrier 86 which is connected with the output drive flange 82.

Ring gear 85 has formed integrally on the outer surface thereof a gear 90 which meshes with an idler gear 91 which in turn meshes with a gear 92 fixed to the outer end of a steering shaft means 93.

A second output means includes an output driving flange 95 which is connected to the righthand end of driven shaft 51 as seen in FIG. 1 by means of a planetary gear set F.

Planetary gear set F includes a sun gear 96, which meshes with planet gears 97 which in turn mesh with a ring gear 98. Planet gears 97 are carried by planet carrier 100 which is drivingly connected with the output drive flange 95.

Formed integrally on the outer surface of ring gear 98 is a gear 102 which meshes with a gear 103 formed at the righthand end of steering shaft 93. A gear 105 is also connected with steering shaft 93 and is drivingly connected with gear 106 as indicated schematically by the dotted line, gear 106 being connected with the hydrostatic unit indicated generally by IV.

The hydrostatic units I, II, III and IV are of identical design and are of a typical well-known construction. As seen for example in hydrostatic unit II, a drum 110 is provided, this drum having a plurality of cylinders therein which slidably receive the individual pistons 111 in a well-understood manner. The end portion of each piston is provided with a ball joint 113 to which a slipper member 114 is pivoted. As shaft 42 rotates, the drum 110, pistons 111 and slipper members 114 rotate. Slipper members 114 bear against a thrust plate 115 supported within and fixed to a swash plate housing 116, the swash plate housing being pivoted on trunions which are indicated by reference numerals 120 in connection with hydrostatic units I, III and IV.

As the drum and pistons turn, the slipper members 114 slide on the thrust plate 115 which cause the pistons to move in and out of the respective cylinders in drum 110 to displace fluid. As the swash plate angle is reduced, the piston stroke is also reduced which, of course, reduces the piston displacement per revolution of the shaft 42.

The lefthand end of the drum 110 as seen in FIG. 1 has a running seal with a conventional distributor valve plate 122. The valve plate is provided with suitable porting which automatically times the fluid flow in and out of the drums and functions in a well-known manner. Passages 123 and 124 within the distributor valve plate 122 provide a hydraulic connection between the hydrostatic units I and II. Similar passages 125 and 126 provide a hydraulic connection between hydrostatic units III and IV.

Figure 3:
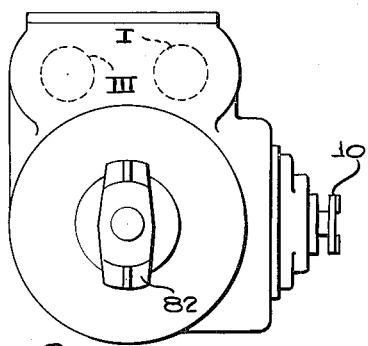
FIG. 3 is a left side view of the casing of a transmission according to the present invention.
Figure 4:
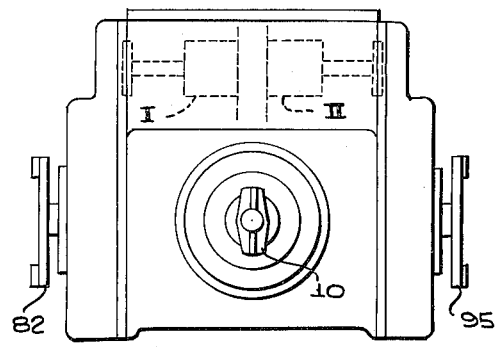
FIG. 4 is a front view of the apparatus shown in FIG. 3.

Referring now to FIGS. 3 and 4, the disposition of the hydrostatic units and the input and output means relative to one another in an actual transmission may be more clearly understood. The speed ratio control means including the planetary gear sets, clutches and brakes are constructed concentrically about the axis of the output flanges 82 and 95. The hydrostatic units are grouped together and located above the mechanical components. The various countershafts and steering shaft as shown in FIG. 1 provide the driving connections between the hydrostatic units and the mechanical components.

It is noted that the transmission according to the present invention provides two basic functions. One of these is to provide steering or vehicle orientation, and the other is to provide speed ratio control or vehicle speed and direction, the direction, of course, being either forward or reverse in this case.

Each of these functions is provided by a separate system which is independently controlled, the two systems, however, being interconnected to control the two individual output drive flanges 82 and 95.

*Steering control operation for modification shown in FIGURE 1*

Steering control of the modification shown in FIG. 1 requires that the speed ratio between the output drive flanges 82 and 95 be varied. This is effected by controlling the final reduction planetary gear sets E and F.

Hydrostatic unit III is a variable displacement pump and is driven as a function of input speed through the driving connection aforedescribed. Hydrostatic unit III is hydraulically connected with hydrostatic motor unit IV which in turn is drivingly connected with the steering shaft 93. Motor unit IV is normally maintained in the position shown with the swash plate positioned at its full displacement. When the pump unit III is at zero displacement position as shown in FIG. 1, the motor unit IV is hydraulically locked and can not rotate. This locks the steering shaft 93 and the ring gears 85 and 98 of planetary gear sets E and F. With these ring gears stationary, the planetary gear sets E and F serve only as reduction gear sets and the driven shaft 51 drives the output flanges 82 and 95 at the same speed which results in straight line operation of the vehicle.

For turning operation, the swash plate housing of the variable displacement steering pump unit III is positioned to a positive angle. This displaces fluid into the motor unit IV which drives the steering shaft 93. Since the lefthand end of steering shaft 93 as seen in FIG. 1 is connected with ring gear 85 through the idler gear 81, it is apparent that the ring gear 85 and ring gear 98 will be driven in opposite directions. This reduces the effective ratio of one planetary gear set while simultaneously increasing the ratio of the other to effect different output speeds. By positioning the steering unit III swash plate housing on either side of zero displacement steering in either direction is provided. As the displacement of the unit III is increased in either direction, the speed of unit IV increases and drives the ring gears of planetary gear sets E and F at higher speeds in opposite direction which accordingly has a tendency to decrease the turning radius by further reducing the effective ratio of one planetary gear set while simultaneously increasing the ratio of the other planetary gear set associated with the output drive flanges.

In tracing the power circuit of the steering system, the input means drives pump unit III through the mechanical gearing connections. Pump unit III drives motor unit IV, this being a variable positive drive. The motor unit IV drives the ring gears of the final reduction planetary gear sets E and F to effect steering.

This type of construction results in completely positive steering control under all conditions of operation. It is noted that there are no brakes or clutches in the steering power circuit, and complete continuously variable steering is effected by the pump and motor units III and IV.

With the steering pump unit III being driven from the input shaft at a constant input speed in a constant displacement position of the swash plate of unit III, the motor unit will drive the ring gears of the output planetary gearings E and F at a fixed speed in opposite directions of rotation.

When driven shaft 51 is stationary, the ring gears will drive the output flanges 82 and 95 in opposite directions at the same speed and the vehicle will then rotate about its own center.

If the same conditions are maintained in the steering system, and the driven shaft 51 now drives the final reduction planetary gearings E and F at the same output speed forward as the steering system is driving the planetary gearings E and F in opposite directions, the net effect will be that one output flange will be stationary and the other will rotate at twice the normal speed. The vehicle will then pivot about one track or wheel.

If the condition of the steering system is still maintained constant and the driven shaft 51 now drives the planetary gearings E and F at a substantially higher speed, the effect of the steering system on the planetary gearings E and F will be to decrease the output speed of one while increasing the speed of the other. This will result in a much larger turning radius. It is accordingly apparent that with this construction, as the speed of the vehicle increases, the sensitivity of the steering system decreases to provide modulated steering which results in more stable steering control and limits the minimum turn radius as the vehicle speed increases.

In certain applications of steering transmissions such as in amphibious type vehicles it is preferred that the controllability or speed ratio range of the steering system be adjustable so that the differential track or wheel speeds might be increased in order to provide more positive vehicle control in flowing streams or in rough water. With this construction as shown in FIG. 1, this is provided by decreasing the swash plate angle or displacement of the steering motor IV. With the motor displacement decreased, for the same displacement of the pump unit III, the motor will rotate faster and drive the steering shaft 93 faster to provide increased steering control.

It will be noted that the steering system of the present invention does not employ any clutches or brakes. During turning operation, the steering shaft 93 drives the ring gear of the planetary gearing E or F connected with the inside track in a reverse direction which slows down the inside track. The steering power used to drive the ring gear in the reverse direction and the retarding power of the track forced to operate at a slower speed is transferred or regenerated from the inside final reduction planetary gearings E or F through the driven shaft 51 to the outside final reduction planetary gearing to increase the tractive effort of the outside track by the same amount that the inside track is initially retarded in oder to effect steering. This steering regeneration assists steering control and increases vehicle performance and mobility.

*Operation of speed ratio control means of FIGURE 1*

To assist in understanding the operation of the ratio system, various speeds and gear ratios have been assigned to the components of the transmission. It should be understood that these values are merely representative for the purpose of illustration, and such values and gear ratios may be varied in accordance with any desired design characteristics.

It will also be understood that a relatively conventional control system may be employed for shifting the swash plates of the hydraulic transmission means as well as for engaging and disengaging the clutches and brakes employed in the ratio system. Such control system may be quite conventional in construction and has been eliminated for the sake of clarity.

Referring again to FIG. 1, hydrostatic units I and II are incorporated in the ratio system. The input member 10 drives the central hollow shaft 17 at a 1.58:1 reduction. With unit II in the full displacement position as shown and unit I at zero displacement, unit II can not displace fluid into unit I and therefore unit II is hydraulically locked. This locks the sun gear 33 of planetary gear set A against rotation. With the sun gear locked, planetary gear set A is so designed as to provide a gear ratio of 1:1.58 overdrive. The net result is that the ring gear 34 rotates at the same speed as the input member 10.

Ring gear 34 is connected to the inner member of clutch M and with this clutch engaged, the driven shaft 51 is driven at the speed of input member 10. The final reduction planetary gear sets E and F provide a 5:1 reduction when the respective ring gears 85 and 98 are locked against rotation.

Figure 5:
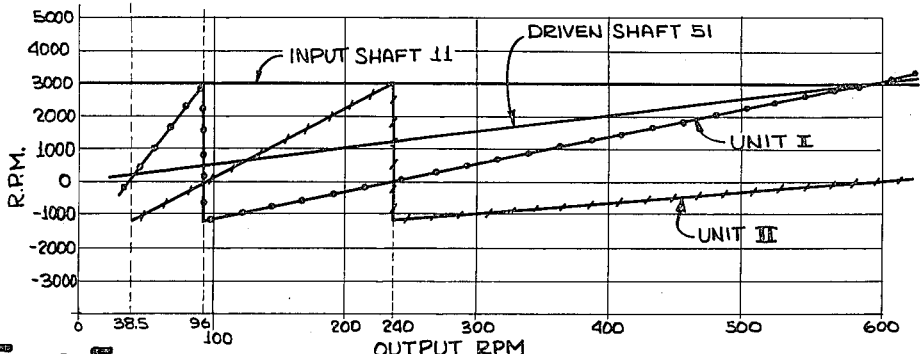
FIGS. 5, 6, 7 and 8 are graphs illustrating certain operating characteristics of the transmission illustrated in FIG. 1.

Operation of the speed ratio control means of FIG. 1 may be understood by reference to FIGS. 5–8, and referring now particularly to FIG. 5, it is assumed that there is a constant input speed of 3,000 r.p.m., and the output speed of the driven flanges 82 and 95 is indicated along the axis of abscissas in this graph. Considering that the point of operation described is near maximum output speed where the speed of the driven shaft 51 is equal to the input speed, it will be seen that the speed of the output flanges 82 and 95 will be 600 r.p.m. since the final reduction planetary gearings E and F provide a 5:1 reduction.

Figure 8:
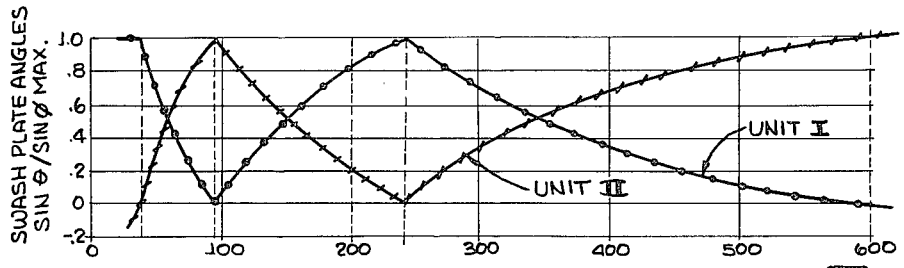

At this same point of operation, it will be seen in FIG. 8 that the swash plate of unit II is at full angle of displacement, and the swash plate of unit I is at zero angle. There is no hydraulic flow at this particular point of operation, and all of the power is transmitted through the planetary gear set A and the clutch M to the driven shaft 51.

Figure 6:
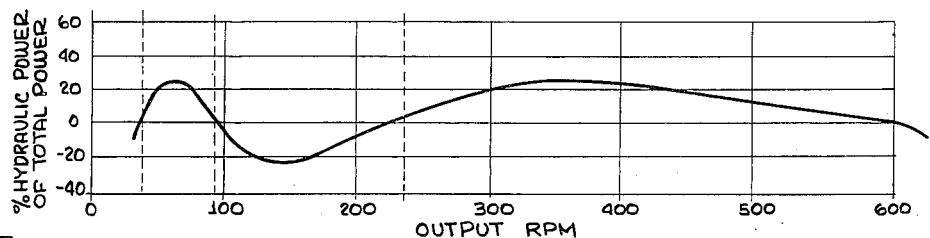

FIG. 6 indicates that there is no hydraulic power being transferred at this point of operation.

Next, considering an output flange speed of 350 r.p.m., FIG. 8 indicates that the swash plate angle of unit II has been decreased from the previously described condition, and the swash plate angle of unit I has been increased. This allows unit II to rotate thereby rotating sun gear 33 and decreasing the output speed of the planetary gear set A. Unit II acting as a pump displaces fluid into unit I acting as a motor which drives the sun gear 60 of planetary gear set C. The sun gear 60 provides a reaction torque on the planet gears 59 which react on the ring gear 56 to drive the planet carrier 57. This planet carrier is connected to the inner member of clutch R, and with this clutch initially engaged, the driven shaft 51 is driven through this clutch.

At this stage of operation with the output flanges 82 and 85 rotating at 350 r.p.m., planetary gear sets A and C are both transmitting power, and the hydraulic circuit is also transferring power. In FIG. 6, it will be seen that the hydraulic power with an output speed of 350 r.p.m. reaches a maximum of approximately 24 percent of the total power being transmitted by the transmission.

As the swash plate of unit I is further increased to full angle and the swash plate of unit II is further decreased to zero angle as indicated in FIG. 8, the swash plate of unit I becomes hydraulically locked which causes sun gear 60 of planetary gear set C to be locked against rotation. Planetary gear set C is so designed as to provide a 1.58:1 reduction ratio and in combination with the 1.58:1 reduction from the input member to the hollow shaft 17, the over-all reduction is 2.5:1. The planet carrier 57 accordingly drives the driven shaft 51 through the clutch R at 1200 r.p.m. which in turn provides an output speed of the driven flanges 82 and 95 of 240 r.p.m. as indicated in FIG. 5. At an output speed of 240 r.p.m. there is again no hydraulic flow and full power is transmitted through the planetary gear set C and clutch R. At this point of operation, the swash plate of unit II is at zero displacement, and accordingly, there is no driving torque on planetary gear set A and clutch M. Accordingly, at this point in the operation, clutch M is disengaged, and brake N is applied. Since there is no torque being transmitted through either clutch M or brake N during this transition, there is no wear on the elements of these components, and further, there is no interruption of power from the input means to the driven shaft 51.

With the brake N applied, the ratio system is adapted to operate at an intermediate speed stage. As seen in FIG. 8, as we proceed to the left in this graph from the 240 r.p.m. point, the angle of the swash plate of unit II is increased while the angle of the swash plate of unit I is decreased. As the swash plate of unit II increases, more power is again transmitted through planetary gear set A. When the swash plate of unit II reaches its full angle, sun gear 33 is again locked, and ring gear 34 rotates at input speed. Since clutch M is now disengaged, ring gear 34 drives sun gear 45 of planetary gear set B. With brake M, applied, the planetary gear ratio of gear set B is 6.25:1. Accordingly, member 50, which is the planet carrier for planet gears 52, drives the driven shaft 51 at 480 r.p.m. which results in an output speed at the output flanges 82 and 95 of 96 r.p.m.

At this point in the operation, the hydraulic flow and power transmitted is again zero, full power being transmitted by planetary gear sets A and B.

At an output speed of 96 r.p.m., the swash plate of unit I is at zero angle and planetary gear set C and clutch R are transmitting no torque. Clutch R is then disengaged and brake S is applied. Since there is no torque being transmitted, this transition is accomplished with substantially no wear on the components of the clutch and brake mechanism and without interrupting the flow of power through the planetary gear sets A and B to the driven shaft 51. With brake S applied, the ratio system is adapted to operate at a low speed stage.

Referring again to FIG. 8, as we again proceed to the left on this graph from an output speed of 96 r.p.m., it will be seen that the angle of the swash plate of unit I is again increased, while the angle of the swash plate of unit II is decreased. When the swash plate of unit I is again at full angle, the sun gear 60 of planet gear set C is again locked. The carrier 57 drives the sun gear 70 of planet gear set D which acts on the planet gears of this gear set to drive the carrier member 80 and the driven shaft 51. With brake S applied, ring gear 72 is locked such that planetary gear set D provides a 6.25:1 reduction.

This, in combination with the reduction of 1.58:1 from the input to the hollow shaft 17 and the planetary gear set C reduction of 1.58:1 results in an over-all reduction to the driven shaft of 15.6:1 and an output speed of 38.5 r.p.m.

Additional output speeds in the forward direction above and below the stages of operation previously described may be provided by adjusting the swash plates of units I and II over their zero displacement positions as indicated in the graphs of FIG. 8.

Referring again to FIG. 6, it will be noted that at 38.5 r.p.m. output, the hydraulic power is again zero and all the power is transmitted through the planetary gear sets C and D. At this condition, when brake S is disengaged and brake T is engaged, ring gear 75 will then be locked while ring gear 72 is free to rotate, and the planet gears 71 drive the idler gears 73 which react on the locked ring gear 75 to drive the carrier 80 in the reverse direction at approximately a −6.25:1 reduction. This provides for operation of the vehicle in the reverse direction. Accordingly, it will be seen that in reverse operation of the present invention, the hydrostatic system is operating at the same power, speed and pressure as in the low speed stage forward.

Referring now to FIG. 9, a modification of the invention is illustrated, which incorporates a synchronizing feature such that when the clutches and brakes employed in the ratio control portion of the transmission are engaged, there is substantially no relative motion between the elements thereof, to further assist in minimizing wear on these elements.

It should be understood that in the modification shown in FIG. 9, only the gearing of the ratio control system has been changed. The construction of the hydrostatic units for both the ratio control system and the steering system are identical with that shown in FIG. 1 and the gearing of the steering system is also identical with that shown in FIG. 1. It will therefore be apparent that the steering system of the transmission shown in FIG. 9 is exactly the same as that previously discussed and operates in a similar manner. Accordingly, the components of the steering portion of the transmission shown in FIG. 9 have been given the same reference numerals primed as applied in FIG. 1, and no further discussion thereof is considered necessary.

It should also be noted that the over-all arrangement of the components of the modification shown in FIG. 9 will be substantially the same as that previously discussed in connection with FIGS. 3 and 4 of the drawings. It will be understood that in this modification as well as that previously described, various components have been shown as formed integrally, whereas they would commonly be constructed as separate components which are connected together in a suitable manner. Furthermore, supporting bearings and the housing structure for the transmission have been eliminated for the sake of clarity.

In this modification, an input flange 140 is formed on a shaft 141 which has a bevel gear 142 at the opposite end thereof which meshes with a bevel gear 143 formed on a shaft 144 which further has a gear 145 formed thereon. Gear 145 meshes with gear 146, gear 146 extending to the left to form a ring gear 147 of a planet gear set indicated generally by G.

Planetary gear set G is a compound arrangement and may be more clearly understood by reference to FIG. 10. Ring gear 147 meshes with the lefthand portion of compound planet gear 150. The smaller righthand portion 150' of gear 150 meshes with a sun gear 152. Sun gear 152 is formed at one end of a hollow shaft 153 which extends to the right and has a gear 154 formed thereon, this gear meshing with an idler gear 155 which in turn meshes with a gear 156. Gear 156 is former at one end of a countershaft 157 having a gear 158 formed at the opposite end thereof. Gear 158 meshes with gear 159 as indicated schematically by the dotted line, gear 159 providing and input to the hydrostatic unit indicated generally by V.

The planet carrier 160 of compound gear set G extends to the left and forms the outer case of a clutch W and continues on to form a sun gear 163 of a planetary gear set H. Clutch W is also connected with a portion 161 of a driven shaft 162 for connecting the planet carrier 160 to the shaft 162. Planet gear 164 meshes with the sun gear 163 and also meshes with a planet idler gear 165 which in turn meshes with a ring gear 166. Disposed about the ring gear 166 is a brake X which may be in the form of a multiple disc type brake which when actuated serves to lock the ring gear 166 against rotation.

Planet gear 170 of planetary gear set G meshes with the lefthand portion of compound planet gear 150 and also meshes with a sun gear 171 formed on a hollow shaft 172 which extends to the right and forms the inner member 173 of a clutch Y. Each of clutches W and Y may also be of a multiple disc type. Member 175 forms the outer case of clutch Y and extends to the left to form a gear 176 which meshes with an idler gear 177. Idler gear 177 meshes with gear 178 formed at one end of a countershaft 179 which has a gear 180 formed at the opposite end thereof. Gear 180 meshes with gear 182 as indicated schematically by the dotted line, gear 182 serving as the input to hydrostatic unit indicated generally by VI. The swash plate means of hydrostatic unit VI is indicated generally by reference numeral 184, a control valve plate 122' being connected between the hydrostatic units in the manner and for the purpose discussed in connection with the structure of FIG. 1.

Member 175 extends to the right and forms the sun gear 190 of planetary gear set indicated generally by J. Planet gears 191 mesh with sun gear 190 and ring gear 192. Planet gears 191 are carried by a planet carrier 193 connected to the driven shaft 162.

A brake Z which may be of the friction disc type is disposed about ring gear 192 and is adapted when actuated to lock the ring gear 192 against rotation.

It will be noted that hydrostatic units III' and IV' of the steering system are identical with that shown in FIG. 1, and unit IV' is connected through gear 106' to gear 105' formed on the steering shaft 93'. In order to provide a driving connection between unit III' and the input of the transmission shown in FIG. 9, an idler gear 200 meshes with a gear 201 formed at one end of a hollow shaft 202 which has a gear 203 formed at the opposite end thereof. Gear 203 meshes with gear 25' as indicated schematically by the dotted line so as to provide a driving connection from the input means to hydrostatic unit III'.

As in the modification shown in FIG. 1, hydrostatic units V and VI are hydraulically interconnected and hydrostatic units III' and IV' and hydraulically connected with each other, each unit being variable by changing the associated swash plate angle. In order to more clearly understand the operation of the modification shown in FIG. 9, various gear ratios and shaft speeds have been assigned to the various members, it being understood that this is merely for the purpose of illustration and is not in any way restrictive.

*Operation of speed ratio control of FIGURE 9 modification*

The operation of the modification illustrated in FIG. 9 may be more clearly understood with reference to the graphs appearing in FIGS. 11–14. The input flange 140 is assumed to drive gear 146 and ring gear 147 of planetary gear set G at a 1.5:1 reduction so that an input speed of 3,000 r.p.m. will result in rotation of ring gear 147 at 2,000 r.p.m.

With hydrostatic unit V at zero displacement and hydrostatic unit VI at full displacement as seen in FIG. 9 unit VI can not displace fluid into unit V which is therefore hydraulically locked. This locks the outer case member 175 of clutch Y and with this clutch initially engaged, the sun gear 171 of planetary gear set G is also locked.

When sun gear 171 is locked, planetary gear set G is designed to produce a 1:1.5 overdrive so that the carrier 160 is driven at 3,000 r.p.m. With the clutch W also engaged, the carrier 160 drives the driven shaft 162 at 3,000 r.p.m. which is the speed of the input. The final reduction planetary gearings E' and F' provide a 5:1 reduction and accordingly, the output speed is 600 r.p.m.

Figure 11:
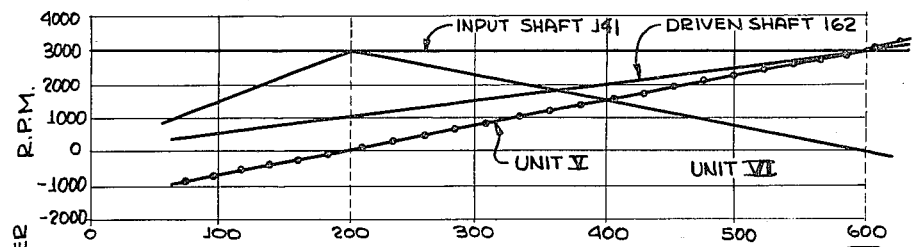
FIGS. 11, 12, 13 and 14 are graphs illustrating certain operating characteristics of the form of the invention shown in FIG. 9 of the drawings.
Figure 12:
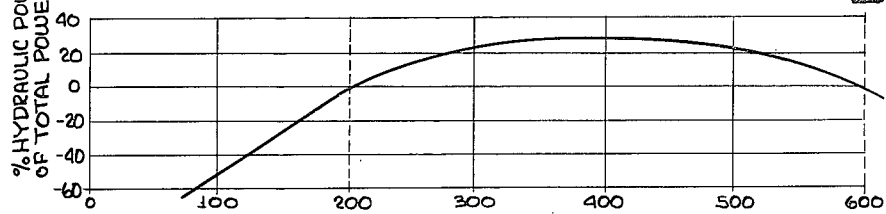
Figure 13:
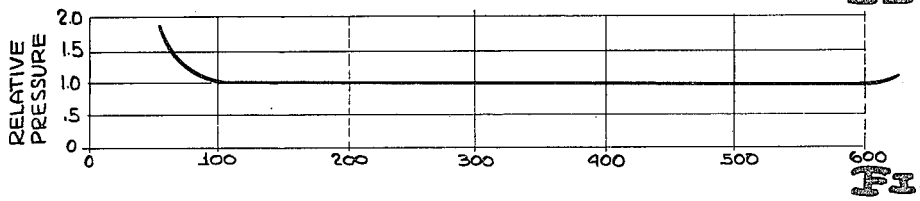
Figure 14:
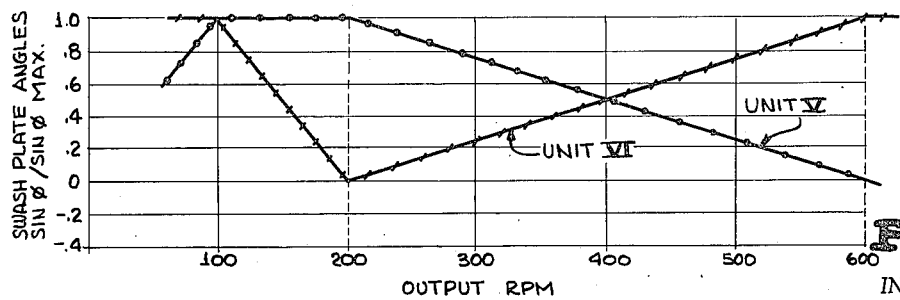

As seen particularly in FIG. 11, at an output speed of 600 r.p.m. the driven shaft 162 is turning at 3,000 r.p.m. which is the input speed, and unit VI is not rotating. FIG. 14 indicates that at this point of operation, the swash plate of unit VI is at full angle and the swash plate of unit V is at zero angle as shown in FIG. 9. Since there is no hydraulic flow at this point of operation, there is no hydraulic power being transmitted at this point as indicated by FIG. 12. With both the clutches W and Y engaged as aforedescribed, the ratio system operates in a high speed stage.

Considering now an output speed of 400 r.p.m. the angle of the swash plate of unit VI has been decreased and the angle of the swash plate of unit V has been increased. This allows unit VI to rotate which causes rotation of sun gear 171 thereby decreasing the output speed of the planetary gear set G. Unit VI acts as a pump and displaces fluid into unit V as a motor which drives the larger sun gear 152 and increases the output torque of the planetary gear set G. At this point of operation, power is transferred by both sun gears of planetary gear set G and the hydraulic circuit is also transferring power.

In FIG. 12, it will be noted that the hydraulic power reaches a maximum of 29 percent of the total power at this speed within the high speed stage of operation.

As the swash plate of unit V is further increased to full angle and the swash plate of unit VI is decreased to zero angle, unit V can no longer displace fluid into unit IV and becomes hydraulically locked thereby also locking sun gear 152 of planetary gear set G. Planetary gear set G is so designed as to provide a 2:1 reduction ratio when sun gear 152 is locked. This 2:1 reduction in combination with the 1.5:1 reduction from the input to the ring gear 147 provides an over-all reduction of 3:1. The driven shaft is accordingly driven at 1,000 r.p.m. which provides an output speed of 200 r.p.m. as seen in FIG. 11. Again at this point of operation, all the power is transferred through the mechanical gearing with no power being transferred through the hydraulic means as seen in FIG. 12.

In order to clearly understand the specific operation further, it is necessary that certain operational relationships between the planetary gear sets G and J be established.

At an output speed of 600 r.p.m., sun gear 171 of planetary gear set G is locked. As the output speed decreases to 200 r.p.m. the sun gear 171 increases in speed in the same direction of rotation as the driven shaft to 6,000 r.p.m. With clutch Y engaged gear 176 and sun gear 190 also rotate at 6,000 r.p.m. Since unit VI rotates at 3,000 r.p.m. at this point of operation, a 2:1 ratio exists between gear 176 and unit VI. With the ring gear 192 locked due to application of brake Z, planetary gear set J is designed to provide a 6:1 reduction ratio from the sun gear 190 to the carrier 193. Further considering operation at an output speed of 200 r.p.m., sun gear 190 operates at 6,000 r.p.m. and shaft 162 operates at 1,000 r.p.m. Therefore, at this point of operation, by choice of construction of planetary gear sets G and J, there is no rotation of the friction disc elements of brake Z.

At an output speed of 200 r.p.m., unit VI is at zero angle and there is no torque on clutch Y. At this point, clutch Y is disengaged and the brake Z is applied. Since there is no torque or speed difference between the friction elements of clutch Y and since the ring gear is stationary, this transition may be made without any wear of the friction disc elements and without any interruption of power flow and also without change of speed and/or direction of rotation of any components within the transmission. With brake Z applied, the ratio control system is adapted to operate in the low speed stage of operation.

Referring again to FIG. 14, as we move to the left in this graph from an output speed of 200 r.p.m., it will be seen that the angle of the swash plate of unit VI is increased and the swash plate of unit V is maintained at full angle. Unit V acts as a pump and displaces fluid into unit VI, the rotation of unit V reducing the planetary gear set G output speed.

Unit VI acts as a motor and drives the driven shaft 162 at a 12:1 multiplication through the planetary gear set J to increase the output torque.

At an output speed of 100 r.p.m. as seen in FIG. 14, the swash plates of both units V and VI are at full displacement. To increase output torque and provide lower speed, the angle of the swash plate of unit V is decreased. For the same reaction torque on unit V the lower swash plate angle increases the hydrostatic pressure and reduces the flow. The higher pressure increases the torque output of unit VI which drives the driven-shaft at lower speed and higher torque.

For reverse operation, the swash plate of unit VI is positioned over center at a negative angle. This provides a reverse driving torque to the driven-shaft. Simultaneously, clutch W is disengaged and brake X is applied. This reverses the normal forward driving torque of planetary gear set G. The ratio system accordingly operates in reverse at the same speed and pressure as it operated in forward in the low stage.

The construction of the modification shown in FIG. 9 is such that not only are the clutches and brakes of the ratio control system unloaded during transition from stage to stage, but the friction elements of the clutches and brakes have substantially no relative motion when engaging and disengaging to thereby reduce wear and extend the life of these components.

Figure 7:
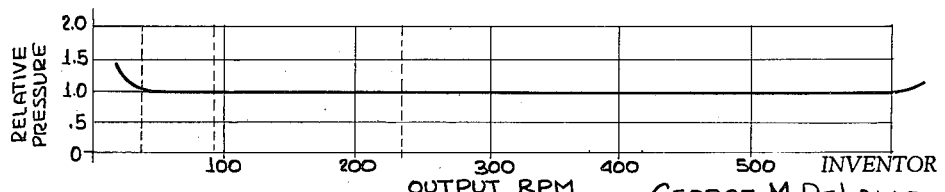

It will be noted in FIG. 12 in connection with the modification shown in FIG. 9, as well as FIG. 7 in connection with the modification shown in FIG. 1, that the hydraulic transmission means operates at a nearly constant pressure over most of the output speed range. This permits the utilization of a lighter construction and also provides a more favorable balance between mechanical and hydraulic forces within the hydrostatic elements which substantially increases the life and efficiency of the apparatus.

It is apparent from the foregoing that there is provided a new and novel steering transmission for track laying vehicles and the like which provides in an integral unit both a continuously variable steering control means and an infinitely variable speed ratio control means which is operable in both forward and reverse directions, and that when operating in reverse, the hydrostatic system operates at low power, low speed and low pressure.

The transmission according to the present invention eliminates the necessity of providing clutch and brake mechanisms in the steering control system, and the steering system is regenerative in that any braking power imposed on an inside track of an associated vehicle while turning automatically increases the tractive power of the opposite or outside track. The steering system is further a modulated one in that as the speed of the vehicle increases sensitivity decreases and results in a larger turning radius to provide greater stability and safety. The transmission incorporates an arrangement whereby the hydraulic means can be made smaller and more compact so as to provide a minimum radius and minimum length.

The shifting of the clutches and brakes of the ratio control system for achieving the desired stages of operation occurs only when the elements of these clutches and brakes are not transmitting power thereby reducing wear. In addition, a further modification is provided whereby the friction elements of the clutches and brakes have substantially no relative movement at the time of engagement to minimize any possible wear and extend the life of these components.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. Steering transmission for track laying vehicles and the like comprising input means, a driven shaft, a pair of spaced output means, each of said output means being connected with said driven shaft by a steering planetary gearing thereby defining a pair of planetary gearings, first ratio control gearing drivingly connected between said input means and said driven shaft, second ratio control gearing drivingly connected between said input means and said driven shaft, a first hydraulic transmission means including an input and an output, the input of said first hydraulic transmission means being connected to a portion of said first ratio control gearing, the output of said first hydraulic transmission means being connected to a portion of said second ratio control gearing, said driven shaft being elongated and being connected at the opposite end portions thereof with each of said planetary gearings, said first and second ratio control gearing including gearing portions positioned between said planetary gearings and carried by said driven shaft and disposed in surrounding concentric relationship with said driven shaft, said first and second ratio control gearings each having a separate drive connection to said common driven shaft, a common steering shaft, said common steering shaft being connected with a portion of each of said steering planetary gearings such that rotation of said steering shaft in one direction will cause movement in opposite directions of the portions of the respective steering planetary gearings connected with the steering shaft, a second hydraulic transmission means including an input and an output, the output of said second hydraulic transmission means being drivingly connected with said common steering shaft, the input of said second hydraulic transmission means being drivingly connected with the input means of the steering transmission, and means for selectively coupling a portion of said first ratio control gearing directly to said driven shaft, and means for selectively locking a portion of said first ratio control gearing against movement.

2. Steering transmission for track laying vehicles and the like comprising input means, a driven shaft, a pair of spaced output means, each of said output means being connected with said driven shaft by a steering planetary gearing thereby defining a pair of planetary gearings, first ratio control gearing drivingly connected between said input means and said driven shaft, second ratio control gearing drivingly connected between said input means and said driven shaft, a first hydraulic transmission means including an input and an output, the input of said first hydraulic transmission means being connected to a portion of said first ratio control gearing, the output of said first hydraulic transmission means being connected to a portion of said second ratio control gearing, said driven shaft being elongated and being connected at the opposite end portions thereof with each of said planetary gearings, said first and second ratio control gearing including gearing portions positioned between said planetary gearings and carried by said driven shaft and disposed in surrounding concentric relationship with said driven shaft, said first and second ratio control gearings each having a separate drive connection to said common driven shaft, a common steering shaft, said common steering shaft being connected with a portion of each of said steering planetary gearings such that rotation of said steering shaft in one direction will cause movement in opposite directions of the portions of the respective steering planetary gearings connected with the steering shaft, a second hydraulic transmission means including an input and an output, the output of said second hydraulic transmission means being drivingly connected with said common steering shaft, the input of said second hydraulic transmission means being drivingly connected with the input means of the steering transmission, and means for selectively coupling a portion of said second ratio control gearing to a member permanently drivingly connected with said driven shaft, and means for selectively locking a portion of said second ratio control gearing against movement.

3. Steering transmission for track laying vehicles and the like comprising input means, an elongated driven shaft, a pair of spaced output means, each of said output means being connected with said driven shaft by a steering planetary gearing connected with spaced portions of said shaft thereby defining a pair of planetary gearings, ratio control gearing drivingly connected between said input means and said driven shaft, said ratio control gearing including gearing portions positioned between said planetary gearings and carried by said driven shaft and disposed in surrounding concentric relationshp with said driven shaft, a plurality of means for selectively effecting a plurality of driving connections between portions of said ratio control gearing and said driven shaft, first hydraulic transmission means including an input and an output, the input and the output of said first hydraulic transmission means each being connected to a portion of said ratio control gearing, a common steering shaft, said common steering shaft being connected with a portion of each of said steering planetary gearings such that rotation of said steering shaft in one direction will cause movement in opposite directions of the portions of the respective steering planetary gearings connected with the steering shaft, a second hydraulic transmission means including an input and an output, the output of said second hydraulic transmission means being drivingly connected with said common steering shaft, the input of said second hydraulic transmission means being drivingly connected with the input means of the steering transmission.

4. Steering transmission for track laying vehicles and the like comprising input means, an elongated driven shaft, a pair of spaced output means, each of said output means being connected with said driven shaft by a steering planetary gearing connected with spaced portions of said shaft thereby defining a pair of planetary gearings, ratio control gearing drivingly connected between said input means and said driven shaft, said ratio control gearing including gearing portions positioned between said planetary gearings and carried by said driven shaft and disposed in surrounding concentric relationship with said driven shaft, first means for selectively effecting a driving connection between a portion of said ratio control gearing and said driven shaft, first hydraulic transmission means including first and second interconnected elements, said first element being connected to a portion of said ratio control gearing, second means for selectively effecting a driving connection between said second element and said driven shaft, a common steering shaft, said common steering shaft being connected with a portion of each of said steering planetary gearings such that rotation of said steering shaft in one direction will cause movement in opposite directions of the portions of the respective steering planetary gearings connected with the steering shaft, a second hydraulic transmission means including an input and an output, the output of said second hydraulic transmission means being drivingly connected with said common steering shaft, the input of said second hydraulic transmission means being drivingly connected with the input means of the steering transmission.

References Cited by the Examiner

UNITED STATES PATENTS

| 2,027,218 | 1/36 | Armington | 74—664 |
| 2,745,297 | 5/56 | Andrus | 74—689 |
| 2,757,513 | 8/56 | Banker | 91—412 |
| 2,808,737 | 10/57 | Bullard | 74—687 |
| 2,912,884 | 11/59 | Christenson et al. | 74—759 |
| 2,972,905 | 2/61 | Bullard | 74—687 X |
| 3,023,638 | 3/62 | Westbury | 74—687 |

FOREIGN PATENTS 1,247,142  10/60  France.

DON A. WAITE, *Primary Examiner.*